United States Patent
Liu et al.

(10) Patent No.: US 7,423,994 B2
(45) Date of Patent: Sep. 9, 2008

(54) METHODS AND APPARATUS FOR SEARCHING A LIST OF PILOT SIGNALS

(75) Inventors: Jing Liu, Boulder, CO (US); Bijan Tuysserkani, Boulder, CO (US); Jon James Anderson, Boulder, CO (US); Kurt William Otte, Boulder, CO (US); Matthias Brehler, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 334 days.

(21) Appl. No.: 11/097,877

(22) Filed: Apr. 1, 2005

(65) Prior Publication Data

US 2005/0232199 A1    Oct. 20, 2005

Related U.S. Application Data

(60) Provisional application No. 60/559,407, filed on Apr. 2, 2004.

(51) Int. Cl.
*H04Q 7/00* (2006.01)

(52) U.S. Cl. ........................ 370/331; 370/235; 370/254; 370/332; 370/342; 455/436; 455/432.1

(58) Field of Classification Search ................. 370/331, 370/235, 254, 332, 333, 335, 338, 342; 455/436, 455/432.1, 437, 438, 439, 440, 442, 443, 455/444, 525
See application file for complete search history.

(56) References Cited

U.S. PATENT DOCUMENTS

| | | | | |
|---|---|---|---|---|
| 5,267,261 A * | 11/1993 | Blakeney et al. | ............. | 370/332 |
| 5,577,022 A * | 11/1996 | Padovani et al. | ............. | 370/332 |
| 6,771,622 B1 * | 8/2004 | Banerjee | ..................... | 370/331 |
| 7,123,913 B2 * | 10/2006 | Akao et al. | ................. | 455/436 |

FOREIGN PATENT DOCUMENTS

| | | |
|---|---|---|
| CA | 2460689 | 4/2003 |
| WO | 9859448 | 12/1998 |
| WO | 0241513 A2 | 5/2002 |

* cited by examiner

*Primary Examiner*—Matthew Anderson
*Assistant Examiner*—Shaima Q Aminzay
(74) *Attorney, Agent, or Firm*—Kenneth K. Vu; Alan C. Gordon; Thomas R. Rouse

(57) ABSTRACT

Methods and apparatus for searching a list of pilot signals. A method is provided for searching a list of pilot signals in a communication network. The method includes defining a prio list that indicates an order in which the list of pilot signals will be searched, obtaining a search duration, and determining an indicator that identifies a portion of the prio list that can be searched within the search duration. The method also includes performing a search of the portion of the prio list, and updating the list of pilot signals based on the results of the search.

35 Claims, 6 Drawing Sheets

| OTA index | 0 | 1 | 2 | 3 | 4 | 5 | 6 | 7 |
|---|---|---|---|---|---|---|---|---|
| OTA_win | 4 | 6 | 8 | 10 | 14 | 20 | 28 | 40 |
| win | 8 | 8 | 8 | 16 | 16 | 24 | 32 | 40 |
| t_est | .111 | .222 | .333 | .444 | .555 | .666 | .777 | .888 |
| OTA index | 8 | 9 | 10 | 11 | 12 | 13 | 14 | 15 |
| OTA_win | 60 | 80 | 100 | 130 | 160 | 226 | 320 | 452 |
| win | 64 | 80 | 104 | 136 | 160 | 232 | 320 | 456 |
| t_est | .999 | 1.111 | 1.222 | 1.333 | 1.444 | 1.555 | 1.666 | 1.777 |

US 7,423,994 B2

METHODS AND APPARATUS FOR SEARCHING A LIST OF PILOT SIGNALS

CLAIM OF PRIORITY UNDER 35 U.S.C. §119

The present Application for Patent claims priority to Provisional Application No. 60/559,407 entitled "Method and Apparatus for Searching a List of Pilot Signals" filed Apr. 2, 2004, and assigned to the assignee hereof and hereby expressly incorporated by reference herein for all purposes.

BACKGROUND

1. Field

The present invention relates generally to the operation of wireless communication devices, and more particularly, to methods and apparatus for generating, maintaining, and searching a list of pilot signals in a wireless communication network.

2. Background

In modern wireless communication devices, such as cellular telephones, there is sometimes a need to determine the energy levels of pilot signals that are received by the wireless communication device. The wireless communication device can then determine which base station to communicate with based on at least the energy levels of the received pilot signals. In some such wireless communication devices, a list of pilot signals and associated energy levels is maintained and continually updated to ensure that the wireless communication device can make the best decision as to which base station through which to communicate. This list is sometimes referred to as a neighbor list.

Generally, many neighbors can be stored in the memory of a wireless communication device. For example, in one case, up to 40 neighbors can be stored. Typically, not all of the neighbors can be searched at one time due to the deleterious effect on the device's battery life. For example, in a device that stores 40 neighbors, a search queue is used to store, for example, up to 16 neighbors (i.e., 16 searches). In this example then, searching the 40 neighbors would be performed using three arbitrary search queues or lists. If there is still time left when all three queues are finished, processing reverts back to the first queue and the process is repeated. Otherwise, if there is not enough time to finish all the queues, the current search queue (whichever queue that may be) is aborted and processing terminates.

In some cases, partial searching is not available, meaning that results are generated for all neighbors in the queue, or no data is generated. This can happen if the window sizes for the neighbors are big while the device is operating in a quick-paging mode, sometimes referred to as QPCH mode. In some systems, there is a very small amount of time on the order of milliseconds for searching in the QPCH mode. If 16 pilots each with a large search window (worst case) are placed in the search list, the search will take too long to complete. Since this search will not be completed in the available time, the search will be aborted and no search data will be obtained.

Since it may seem that using large window sizes causes the search problem described above, the solution appears to be to search using a smaller window. However, using smaller window sizes may also risk missing good pilot signals that are outside of the smaller window range, due to differential propagation delays in large cell radius situations. Thus, serious problems may occur when base stations are spread out over large geographic areas where large windows are really needed to receive the far multipaths.

Therefore, what is needed is a system that operates to search for pilot signals in a wireless network where the quantity of searching is adjusted to fit within the available search time, with the attempt to minimize device 'awake' time. The system should also operate to reduce the window size necessary for searching selected pilot signals allowing either more pilots to be searched within a given time interval, without missing good pilot signals that are outside of the smaller window range, or allowing the device to remain awake for a shorter period of time, reducing battery consumption.

SUMMARY

In one or more embodiments, a pilot search system comprising methods and apparatus is provided for effectively searching a list of potentially available pilot signals in a wireless communication network. For example, in one embodiment, the system is suitable for use in a wireless communication device to allow the device to efficiently search a list of pilot signals to generate sorted sets of pilot energies to aid reacquisition and handoff, thereby allowing quick, efficient and reliable communications with a wireless network.

In one embodiment, the system operates to adjust the amount of searching to fit within the available search time so that the device may quickly return to the standby mode to conserve battery power. In another embodiment, the system operates to reduce the window size used for searching selected pilot signals so that more pilots may be searched within a given time interval without missing good pilot signals that are outside of the smaller window range. This provides improved performance since more pilots can be searched while still conserving battery power.

In one embodiment, a method is provided for searching a list of pilot signals in a communication network. The method comprises defining a prio list that indicates an order in which the list of pilot signals will be searched, obtaining a search duration, and determining an indicator that identifies a portion of the prio list that can be searched within the search duration. The method also comprises performing a search of the portion of the prio list, and updating the list of pilot signals based on the results of the search.

In one embodiment, apparatus is provided for searching a list of pilot signals in a communication network. The apparatus comprises pilot prioritization logic that operates to define a prio list that indicates an order in which the list of pilot signals will be searched, obtain a search duration; and determine an indicator that identifies a portion of the prio list that can be searched within the search duration. The apparatus also comprises search logic that operates to perform a search of the portion of the prio list, and processing logic that operates to update the list of pilot signals based on the results of the search.

In one embodiment, apparatus is provided for searching a list of pilot signals in a communication network. The apparatus comprises means for defining a prio list that indicates an order in which the list of pilot signals will be searched, means for obtaining a search duration, and means for determining an indicator that identifies a portion of the prio list that can be searched within the search duration. The apparatus also comprises means for performing a search of the portion of the prio list, and means for updating the list of pilot signals based on the results of the search.

In one embodiment, a program of machine-readable instructions executable by a digital processing apparatus to perform a method for searching a list of pilot signals. The method comprises defining a prio list that indicates an order in which the list of pilot signals will be searched, obtaining a search duration, and determining an indicator that identifies a portion of the prio list that can be searched within the search duration. The method also comprises performing a search of the portion of the prio list, and updating the list of pilot signals based on the results of the search.

Other aspects, advantages, and features of the present invention will become apparent after review of the hereinafter set forth Brief Description of the Drawings, Detailed Description, and the Claims.

BRIEF DESCRIPTION OF THE DRAWINGS

The foregoing aspects and the attendant advantages of the embodiments described herein will become more readily apparent by reference to the following detailed description when taken in conjunction with the accompanying drawings wherein.

DETAILED DESCRIPTION

In one or more embodiments, a pilot search system is provided for efficiently searching, maintaining, and updating a list of pilot signals in a communications network. For example, the system is suitable for use in a wireless device to search for pilot signals in a wireless communication network. Because the system provides efficient pilot signal searching and minimizes search time, the device's battery power can be conserved. In one embodiment, the system operates to reduce the window size used to search strong pilot signals, thereby reducing search time and/or allowing more pilots to be searched in a given time interval. Furthermore, the system is suitable for use in virtually any type of wireless communication network, and is especially well suited for operation in wireless communication networks utilizing code division multiple access (CDMA) technology.

Figure 1:
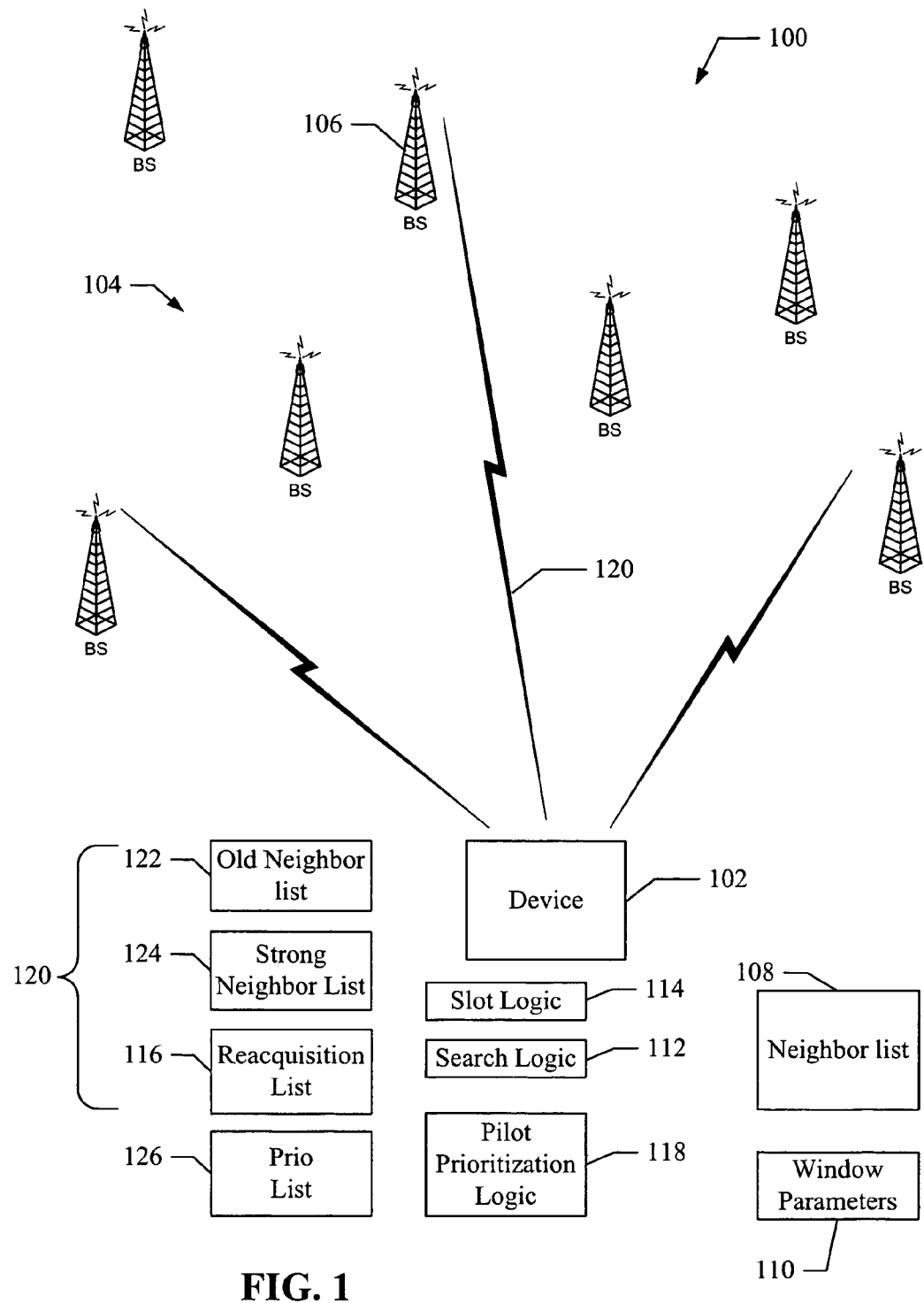
FIG. 1 shows a wireless communication network that includes a device that comprises one embodiment of a pilot search system.

FIG. 1 shows a wireless communication network 100 that includes a device 102 that comprises one embodiment of a pilot search system. The communication network 100 comprises a number of base stations (BS), shown generally at 104, which are capable of wirelessly communicating with the device 102. For example, the base station 106 may communicate with the device 102 to provide voice, data, and/or other network services. For the purpose of this description, it will be assumed that the wireless network 100 is implemented using a wireless communication technology, such as CDMA technology. However, it is again noted that the use of other wireless network technologies are possible within the scope of the described embodiments.

During operation, the network 100 broadcasts information and other parameters over-the-air (OTA) from each base station so that devices in the geographic region may receive these parameters and use them to access and/or operate on the network. For example, each base station broadcasts a neighbor list 108 that identifies the timing location (phase offset) of pilot signals broadcast by base stations in the area. For example, the neighbor list 108 may comprise a list of up to forty pilot signals that are transmitted from base stations in the geographic region. Each pilot signal comprises a pseudo-random code (PN) that is phase offset relative to a system timing reference. Thus, by detecting a pilot signal with a particular phase offset, it is possible to identify a particular base station through which the device 102 will communicate with the network 100.

Other broadcast parameters within the neighbor list 108 include window size parameters 110 ("OTA window") that are used by a device to set a window size or set of timing hypotheses for acquiring the selected pilot signals. For example, the window size 110 indicates a number of timing offsets centered on the estimated location of the pseudo-random sequence that the device needs to search/test/correlate for the pilot signal. Based on the network's timing, the window size is a parameter that helps to determine how long it will take to search for a particular pilot signal. For example, the window size parameter 110 is generally large enough to accommodate for the fact that there may be significant propagation delays associated with pilot signals transmitted from far off base stations. Based on the operation of the network, there may be one window size to be used for all pilot signals, multiple window sizes, or a specific window size to be used for each pilot signal in the neighbor list 108. In one embodiment, because the window size parameter 110 implies a search time for a given correlation size, it can then be used to determine how many pilot searches can be performed in a given time interval. It will be assumed that the neighbor list 108 and the window parameter 110 have been transmitted OTA and received by the device 102, as shown in FIG. 1.

The device 102 comprises a mobile telephone, pager, email device, PDA, portable computer, or any other device that is operable to communicate with the base stations 104 to use the communication network 100. The device 102 communicates over the network 100 by selecting a base station through which communications with the network 100 will occur. To select a base station, the device 102 searches pilot signals that are transmitted from the base stations 104 to find the strongest received pilot signals. In one embodiment, the device 102 includes search logic 112 that operates to search and determine signal strength for selected pilot signals. The search logic 112 comprises any suitable search logic that is operable to search for and detect the signal strength of one or more pilot signals. The device typically assigns the strongest pilot signal to be the active pilot signal and then operates to establish communications with the base station broadcasting that active pilot signal. Once communications are established, the device may receive communications (i.e., pages, voice calls, etc.) from other network devices or from a PSTN via that base station.

In one embodiment, the device operates in what is referred to as "slotted" mode. In slotted mode, the device 102 is assigned periodic time intervals (slots) when it may expect to receive network communications. Between the slot intervals, the device 102 goes into a standby or "sleep" mode that helps conserve battery power. The device "wakes up" for its assigned slot interval in order to determine if another device on the network is attempting to communicate with it. In one embodiment, the device 102 comprises slot logic 114 that operates to periodically wake up the device to place it in an "active" mode prior to its slot interval, and then place the device in standby mode between slot intervals.

Because the device 102 operates in slotted mode, the device 102 reestablishes communications with the network 100 prior to the start of every slot. For example, just before the beginning of a slot interval, the device uses the pilots identified in previous series of pilot searches 116 to establish communication with the network 100. Once communications are reestablished and the slot has begun, the device 102 checks to see if another network device is trying to make contact.

After the device has completed its processing during the slot, or if the end of the slot interval occurs first, the device 102 is placed in standby mode by the slot logic 114. The device 102 remains in standby mode until the slot logic 114 awakens it prior to the start of the next slot interval. Because the network environment may change while the device 102 is in standby mode, the previously active pilot signal may begin to lose signal strength. Thus, the device 102 needs to conduct a search for other strong pilots signals to determine a base station through which network communications will occur.

In one embodiment, the device 102 comprises pilot prioritization logic 118 that operates to prioritize the pilots in the neighbor list 108 into a pilot list 120. For example, the pilot list 120 comprises an previously seen or historical neighbor list 122 and a strong neighbor list 124. The old neighbor list 122 comprises a list of pilot signals from the neighbor list 108 whose received signal strengths have not been previously seen by the search logic 112 for the longest amount of time. The old neighbor list 122 is arranged from oldest to newest. The strong neighbor list 124 comprises a list of pilot signals from the neighbor list 108 that have been detected by the search logic 112 to have the strongest signal strengths. The strong neighbor list 124 is arranged from strongest to weakest. The pilot list 120 also includes the reacq list 118, which comprises a list of pilot signals that will be searched by the device prior to the start of the next slot interval for the purpose of reestablishing communications with the network 100.

In one or more embodiments, the pilot prioritization logic 118 operates to process the pilot list 120 to generate a prioritization (prio) list 126 that will be searched by the search logic 112 while the device is in the active mode. The results of the prio list 126 search will be used to update the pilot list 120. For example, after the device 102 has begun its slot processing, the pilot prioritization logic 118 operates to control the search logic 112 to search the pilot signals identified in the prio list 126. For example, the prio list 126 identifies the order in which old pilots 122, strong pilots 124 and pilots in the current reacq list 116 are searched. In one embodiment, the order allows all the pilots in the pilot list 120 to be revisited at a selectable rate so that strong pilots are not overlooked even if they have not be searched for a long time. The organization of the prio list 126 is discussed more fully in another section of this document.

In one embodiment, the prio list 126 searches occur during the time the device is active within the slot interval. For example, if the device is active for the entire slot, the prio search may continue for the entire slot. If the device does not need to be active for the entire slot and decides to enter standby mode before the end of the slot interval, the prio list search ends just before the device enters the standby mode. It should be noted that the prio list searches might be extended beyond the end of the slot interval; however, it is preferable that the prio searches occur only while the device is in the active mode, thereby conserving battery power.

In one embodiment, the strongest list 116 identifies several pilot signals that will be searched prior the start of the next slot interval to allow the device to reestablish communications with the network. In one embodiment, the reacq list 116 comprises the active pilot, and the next several strongest pilots from the pilot list 120.

Thus, in one or more embodiments, the pilot search system operates to perform one or more of the following functions to quickly and efficiently maintain and search a list of selected pilot signals to determine a base station through which communications with the network will occur.

1. At a selected time prior to a slot interval, the device go into the active mode and pilot signals in a reacq list 116 are used to establish communications with the network.
2. After the start of the slot interval, the system performs prio list 126 searches and updates the pilot list 120 with the results.
3. At the end of device processing during the slot, or at the end of the slot interval, the prio list 126 searches are completed and the device enters the standby mode.
4. The system updates the reacq list 116 based on new information in the pilot list 120 and returns to step 1.

In another embodiment, the pilot prioritization logic 118 operates to improve the searching performed in step two above by shortening one or more search windows used to search strong pilot signals identified in the prio list 126. For example, pilot signals in the prio list 126 that are taken from the strong neighbor list 124 are searched with a window size that is smaller than indicated by the window parameter 110. For example, since the timing of the pilots in the strong neighbor list 124 is well known, the window size that is utilized is made smaller and more focused. As a result, the search time for those pilots is reduced so that the prio list search may be completed very quickly, or so there is more time to search for additional pilot signals while the device is active than if the window parameter 110 was used. Thus, embodiments of the system operate to offer improved performance over conventional systems by allowing more pilots to be searched while minimizing the time the device is actively searching pilots.

Thus, in one or more embodiments, a pilot search system is provided that operates to maintain, search and update pilot signals in a pilot list. The system also operates to increase the number of pilots searched in a given time interval by utilizing smaller window sizes for selected pilot signals and thereby allowing more pilot signals to be searched while the device is an active mode.

Figure 2:
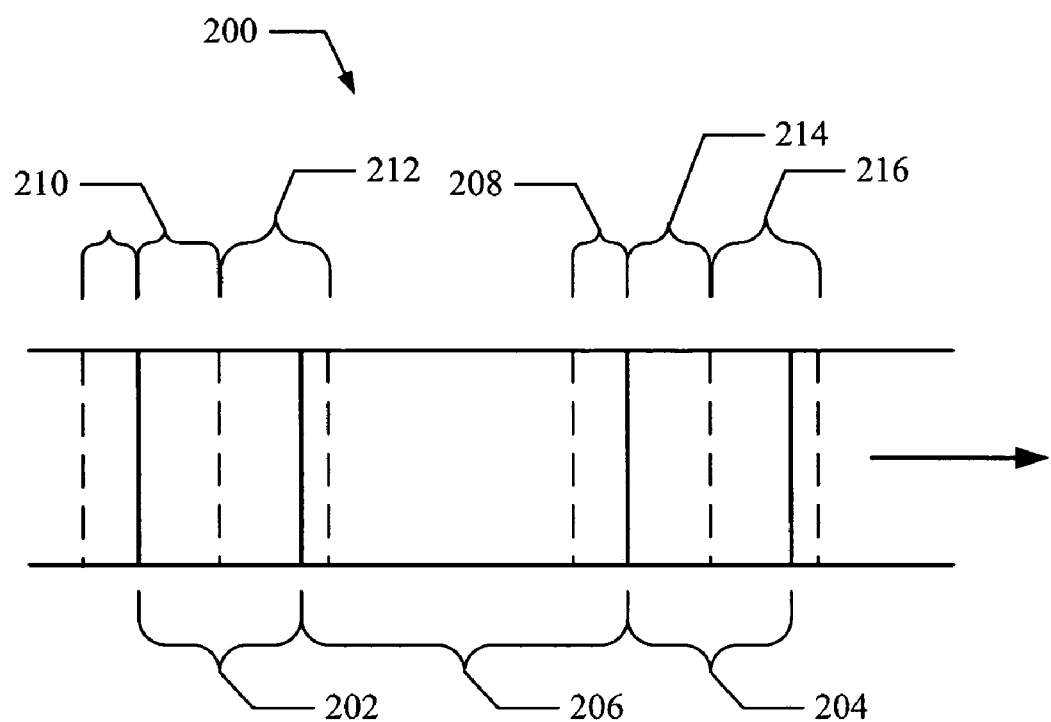
FIG. 2 shows a timing diagram that illustrates the operation of one embodiment of a pilot search system in a device operating in slotted mode.

FIG. 2 shows a timing diagram 200 that illustrates the operation of one embodiment of a pilot search system in a device operating in slotted mode. For example, the timing diagram 200 will be described with reference to the device 102 in FIG. 1. It should be noted that embodiments of the system are suitable for use with any system that tries to monitor the environment in small snapshots.

The timing diagram 200 shows two slot intervals 202, 204 that are separated by a standby interval 206. Typically, the standby interval 206 is approximately five seconds in duration. The slot intervals 202, 204 represent intervals when the device 102 should to be active to receive communications from the network. Typically, the slot interval is approximately eighty milliseconds in duration. During the standby interval 206, the device 102 is generally not in communication with the network and operates in a low power mode.

At the time interval 208, which occurs prior to the start of slot 204, the device 102 wakes up and establishes communication with the network using the reacq list 116. In one embodiment, the system updates the reacq list 116 based on the results of a prio list search that occurred during the time interval 210 of the slot 202. For example, at the time interval 212, the results of the prio list search conducted during interval 210 are used to generate an updated reacq list 116. Once the slot 204 begins the device operates to determine if another network entity is attempting to make contact during the interval shown at 214. If no one is attempting to contact the device 102, it may be active for less than the full slot duration. For example, the interval 214 may have a duration of twenty milliseconds or less.

In one embodiment, the system conducts a prio list search as described herein during the interval 214. When the interval 214 ends, the prio list search also ends. For example, the system conducts prio list searching only as long as the device needs to be active to communicate with the network. When the device no longer needs to be active, and is ready to return to the standby mode, the prio list searching ends. Thus, in one embodiment, the prio list searching ends before the end of the slot 204, and in another embodiment, the prio list searching continues until the end of the slot 204.

After the active interval 214, the device returns to the standby mode (i.e., turns off RF circuit) and the system operates to process the prio list searching results to update the reacq list 116 during the interval 216. The device will again wake up and reestablish network communications prior to the start of the next slot interval by using the updated reacq list 116. Thus, the system operates to efficiently search pilot signals during the active interval within a slot and updates the reacq list when the active interval ends.

Figure 3:
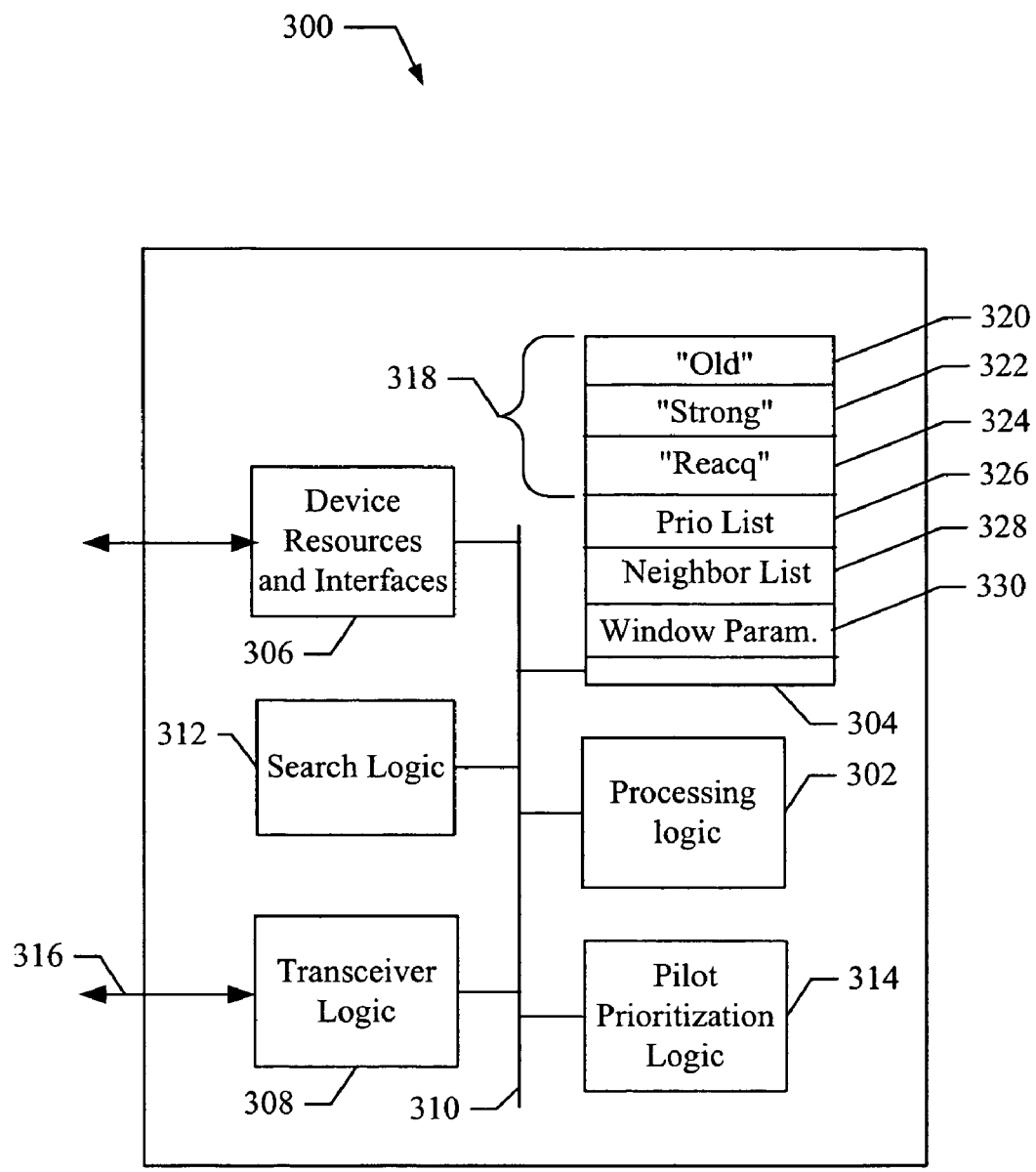
FIG. 3 shows one embodiment of a pilot search system for use in a wireless communication device.

FIG. 3 shows a detailed diagram of one embodiment of a device 300 that comprises a pilot search system for efficiently searching pilot signals in a wireless network. For example, the device 300 is suitable for use as the device 102 shown in FIG. 1. The device 300 comprises processing logic 302, memory 304, device resources and interfaces 306, and transceiver logic 308, all coupled to a data bus 310. The device 300 also comprises search logic 312 and pilot prioritization logic 314 that are also coupled to the data bus 310.

In one or more embodiments, the processing logic 302 comprises a CPU, processor, gate array, hardware logic, memory elements, virtual machine, software, and/or any combination of hardware and software. Thus, the processing logic 302 generally comprises logic to execute machine-readable instructions and to control one or more other functional elements of the device 300 via the internal data bus 310.

The device resources and interfaces 306 comprise hardware and/or software that allow the device 300 to communicate with internal and external systems. For example, internal systems may include mass storage systems, memory, display driver, modem, or other internal device resources. The external systems may include user interface devices, printers, disk drives, or other local devices or systems.

The transceiver logic 308 comprises hardware and/or software that operates to allow the device 300 to transmit and receive data and other information with an external communication network or system. For example, the transceiver logic 308 comprises a communication link 316 that allows the transceiver logic 308 to transmit and receive data and/or other information over a wireless communication network. For example, in one embodiment, the transceiver logic 308 operates to receive one or more pilot signals that have been transmitted from one or more base stations. The received pilot signals are used to identify base stations through which communications with a wireless network will occur. Thus, the device 300 is able to communicate with other network entities, such as remote base stations, terminals, devices or any other type of network entity.

The search logic 312 comprises a CPU, processor, gate array, hardware logic, memory elements, virtual machine, software, and/or any combination of hardware and software. The search logic 312 generally comprises logic to search for pilot signals in a communication network. In one embodiment, the search logic 312 operates to search for one pilot at a time, and in another embodiment, the search logic 312 operates to search for multiple pilot signals simultaneously.

The memory 304 comprises any type of memory suitable for storing information at the device 300. For example, in one embodiment, the memory 204 is used to store a neighbor list 328 and window parameters 330 that are received by the transceiver logic 308. For example, the neighbor list 328 represents a list of pilot signals that are being transmitted by base stations in the area. The window parameters 330 are one or more parameters that are transmitted by the base stations as part of network information parameters, which are used by devices to access the wireless communication network. For example, the window parameters 330 indicated the window size that should be used to search for selected pilot signals.

The pilot prioritization logic 314 comprises a CPU, processor, gate array, hardware logic, memory elements, virtual machine, software, and/or any combination of hardware and software. The pilot prioritization logic 314 operates to allow the device to efficiently search pilot signals from the neighbor list 328 so that the device 300 may communicate with the wireless network without service interruptions. For example, the pilot prioritization logic 314 operates to organize the pilots in the neighbor list into a pilot list 318 that comprises old pilots 320, strong pilots 322, and reacquisition pilots 324. Prior to searching, the pilot prioritization logic 314 generates a prio list 326 that identifies how pilots selected from the pilot list 318 will be searched. The pilot prioritization logic 314 operates to search, maintain, and update the pilot list 318, and as a result, the reacquisition list 324 is periodically updated. The device 300 uses the pilot signals identified in the reacquisition list 324 to establish communications with the network. For example, in slotted mode operation, the device 300 wakes up prior to the beginning of a slot and uses the pilot signals identified in the reacquisition list 324 to establish communications with the network.

In one embodiment, the pilot search system comprises program instructions stored on a computer-readable media, which when executed by the processing logic 302, provide the functions of the device 300 described herein. For example, instructions may be loaded into the device 300 from a computer-readable media, such as a floppy disk, CDROM, memory card, FLASH memory device, RAM, ROM, or any other type of memory device or computer-readable media that interfaces to the device 300 via the device resources 306. In another embodiment, the instructions may be downloaded into the device 300 from a network resource that interfaces to the device 300 via the transceiver logic 308. The instructions, when executed by the processing logic 302, provide one or more embodiments of a pilot search system as described herein.

During operation, the device 300 operates according to one or more embodiments of a pilot search system to search and maintain the pilot list 318. In one embodiment, pilot signals from the pilot list 318 are organized into the prio list 326 that identifies an order for searching the pilots signals so that old pilots and strong pilots are searched during each prio list search, and that all pilot signals are revisited at a selectable rate. A detailed description of the prio list construction is provided in the following text.

Prio List Construction

In one or more embodiments, a prio list is constructed that represents a list of pilot signals from a pilot list to be searched. In one embodiment, the pilot list identifies pilots as old pilots (O), strong pilots (S), and reacquisition pilots (reacq). In one embodiment, the prio list is then constructed as follows:

O1, O2, S1 S2 S3, O3, O4, S4 . . . S33, reacq1 . . . reacq3 where O1, O2, O3, and O4 are the oldest pilot signals identified in the old pilot signal list 320, and S1, S2 . . . S33 are the strong pilot signals (S1 is strongest) identified in the strong pilot list 322, and reacq1-reacq3 are reacquisition pilot signals identified in the reacquisition pilot list 324. In other embodiments, the prio list may comprise other predefined types of pilot signals, or contain fewer or a greater number of pilot signals. A prio list constructed in this way allows O1 . . . O4, S1 . . . S11 and the active pilot to be placed in the first queue of 16 search tasks performed by the search logic 312 provided enough time is available in the slot to complete the search. In another embodiment, if there is only time to search less than 16 pilots, it is preferable to search a selected number of strong and old pilots.

In one embodiment, three pilots from the reacq list 324 are included in the prio list. For example, by constructing a prio list to contain the two oldest pilots and three strongest pilots, by including three pilots from the reacq list a good picture of what the current network environment is like can be obtained.

In one or more embodiments, an algorithm is provided for constructing a prio list. For example, the algorithm constructs the prio list to include old pilots, strong pilots, and pilots from the reacquisition list. In one embodiment, the algorithm is defined as follows.

Define:
  Oldest_Block1_Count=2
  Strongest_Block1_Count=3
  Oldest_Block2_Count=2
1. Initialize Prio list to be empty
2. Add oldest pilots to Prio list up to Oldest_Block1_Count
3. Add strongest pilots to Prio list up to Strongest_Block1_Count
4. Add next oldest pilots to Prio list up to Oldest_Block2_Count
5. Add remaining strong pilots
6. Add reacquisition list pilots if not already included from above In another embodiment, the window size used to search strong pilots is reduced so that the search of those pilots occurs more quickly, or so that more pilot signals can be searched in the same time interval. As a result, it is possible to complete the prio list search more quickly and thereby conserve battery power.

Search Time Estimation

In one embodiment, the prio list search scheduling operates by proceeding down the prio list in sequence and placing as many pilots into the search queue as can be finished given the available time. This requires knowledge of the amount of time a certain search list takes. In one embodiment, the search time can be approximated as a linear function of the window size (N) and the queue size (M) Thus, the search time can be estimated either by a table lookup or by a formula-based computation. In the table look-up, it is simply a matter of accessing a table given the parameters N and M to determine a good approximation of the required search time. In the formula-based computation, several parameters are computationally processed to obtain a search time estimation. Both techniques are discussed in the following text.

Table-Based Search Time Estimation

Figure 4:
FIG. 4 shows one embodiment of a table that allows search times to be estimated.

The following is an example of one embodiment of table-based search time estimation for use in one embodiment of a pilot search system. Table search method allows a table to be accessed to estimate a search time. FIG. 4 shows one embodiment of a table 400 that allows search times to be estimated. As a result of the table search, the time is estimated to be t_ovhd=0.25, where t_ovhd is the software overhead time to program a new search in the hardware. Since, in one embodiment, the search logic handles window sizes that are a multiple of 8 chips, the window size needs to be first converted as follows:

$$\text{win} = \text{ceiling}(OTA_{win}/8)*8.$$

As an example of how to calculate the total search time from the table 400, it will be assumed that a queue contains 16 pilots where 10 pilots use 320-chip windows, and 6 pilots use 100-chip windows. The total search time can be determined from;

$$(10*1.666+6*1.222)+t\_ovhd=24.242 \text{ ms}$$

where the table 400 is used to determine time estimates for the 320 and 100 chip windows, respectively.

Formula-Based Search Time Estimation

The following is an example of one embodiment of formula-based search time estimation for use in one embodiment of a pilot search system. Formula search method allows a formula to be computed to estimate a search time. For a queue of search tasks with window size [win_1size, win_2size, win_3size . . . ], the search time is computed from.

$$T=(\text{time to srch win\_1size})*(\#\text{neighbors}@\text{win\_1size})+t\_ovhd_{forwin}1+(\text{time to srch win\_2size})*(\#\text{neighbors}@\text{win\_2size})+t\_ovhd_{forwin}2+\ldots$$

Just as in the table based approach, window size w has to be converted to w=ceiling (w/8)*8 before the formula can be used.

Since there is generally only fixed-point arithmetic in a wireless device, the above formula for search time estimation may need to be adapted, trading off complexity versus accuracy. As a first step, the device does the computation in microseconds, rather than in milliseconds. Consequently, all parameters (i.e., a,b,c) are multiplied by 1000, and the only problematic operation left is the multiplication of a*1000=1.8. While a simple rounding of 1.8 to 2 has least execution time it overestimates the search time on the order of 10%. An approximation of 1.8 as 231/2^7=1.805 would require a multiply with a non-power of two, which is considered to be expensive. Thus, the multiply by 1.8 can be approximated by 2*x−¼*x+¹⁄₁₆*x=1.8125*x, which requires only 3 shifts/adds and slightly overestimates the search time. But a little bit of overestimating is more desirable than to aborting ongoing searches.

Prio Search Scheduling

With a limited amount of time, a prio search can either examine fewer neighbors closely with large OTA windows, or cover more neighbors with a smaller window. Two situations that may occur are described as follows.
1. Downtown deployment where the signals bounce off the buildings and produce lots of close multipaths. In this case, the OTA windows will most likely be small, and it may be more important to look through all the neighbor PNs to find the ones that are sufficiently strong and stable.
2. Rural deployment where the cells are bigger and farther away from each other. Here the OTA windows are usually large and following the large OTA windows will probably be necessary to recover the paths that are arising from a certain distance away.

Therefore, assuming a reasonable network deployment (the OTA window sizes from the overheads correspond to the physical setup), it's important that pilots are searched using OTA windows. This means more neighbors can be searched when OTA windows are small, which works nicely for a pilot dense area. Fewer neighbors can be searched when OTA windows are large, but this will not be a major problem since the cells tend to be sparsely deployed in these areas.

In one embodiment, only 3.6 milliseconds are available for the prio search in QPCH mode. Therefore a minimum prio search queue size is defined, PRIO_MIN-QUEUE_SIZ, to be 5. In this minimum queue, the pilots are O1 O2 S1 S2 and the active pilot. The basic idea is always try to put as many pilots into the prio search queue as possible. If the minimum queue size can be searched with OTA window, then they are searched with OTA windows. This queue is called a normal prio search queue. Otherwise, only search O1 O2 and the active pilot with OTA windows and search the others pilots with a smaller window. This queue is called a reduced prio search queue. In this way, OTA windows are used as long as a minimum number of pilots can be covered. Otherwise, a certain search rate with OTA windows for the old neighbors is used. Furthermore, this approach has several other advantages. First, the prio list is searched with OTA window size whenever appropriate. Second, given the available time, the maximum number of pilots that can be searched will actually be searched. This is made possible by the capability to estimate the search time.

Search Window Positioning

In one or more embodiments, search window positioning is performed as follows. Assuming Pilot A is the active pilot, and Pilot N is the pilot to be searched, the search window centering is (Pilot N-Pilot A)*64 (modulus 2^15) chips from the current position. The current position is defined by the earliest arriving path of the active Pilot A. Thus, the search window size should account for the maximum path delay that can occur between the earliest arriving path of the active Pilot A and the latest arriving path of Pilot N. Path delay in chips corresponds directly to difference in path lengths with one chip corresponding to 244 milliseconds. Thus, assuming a meaningful network configuration, the OTA window sizes specified for the neighbors correspond to the maximum expected delay/distance of the neighbor Pilot to the active Pilot. For example, a window size of 452 corresponds to a maximum delay/advance of 226 chips. i.e., 184 us or 55.2 km (arising in large cells and/or paths traveling over water).

Consequently, one way to guarantee finding a neighbor Pilot is to search with OTA window sizes. However, as discussed above, for large windows this is time-consuming and sometimes requires searching with shorter windows. For example, with reacq window size of 64 chips. Searching with smaller than OTA window sizes requires centering the window in a smart way, because otherwise the signal peaks may be missed (if the delay/advance is greater than 32 chips, i.e., 26 us or 7.8 km). Given access to the last search result for Pilot N which contains at least one signal peak (defined as a peak whose Ec/Io surpasses a selected energy threshold, the obvious choice is to center the non-OTA search around the previous strongest signal peak. However, it must be ensured that the non-OTA window stays within the OTA window, so that the only pieces of the PN circle searched are specified by the network. In one embodiment, this peak based window positioning is utilized for the reacq searches (which so far uses PN centering only) and for the non-OTA search tasks in the reduced prio search queue. In case the last search contains no signal peak, the usual PN centering is used. Since the reduced prio queue contains, in one embodiment, 2 oldest neighbors that are searched with the OTA window size, it is guaranteed that after a maximum of 20 wakeup cycles all neighbors will have been searched with the OTA windows. Once a strong neighbor has been identified, it is tracked by continuously adjusting the 64-chip reacq window around its strongest peak.

When implementing the search window positioning, in some cases the reference count between two wake-up cycles is offset by the number of chips of residual sleep time (the sleep time which was not a multiple of the whole PN circle). Thus, search results (which are reported relative to the reference count) between two wake-up cycles should be adjusted by the sleep time modulus the PN circle. This is done for signal peaks upon wake-up.

Figure 5:
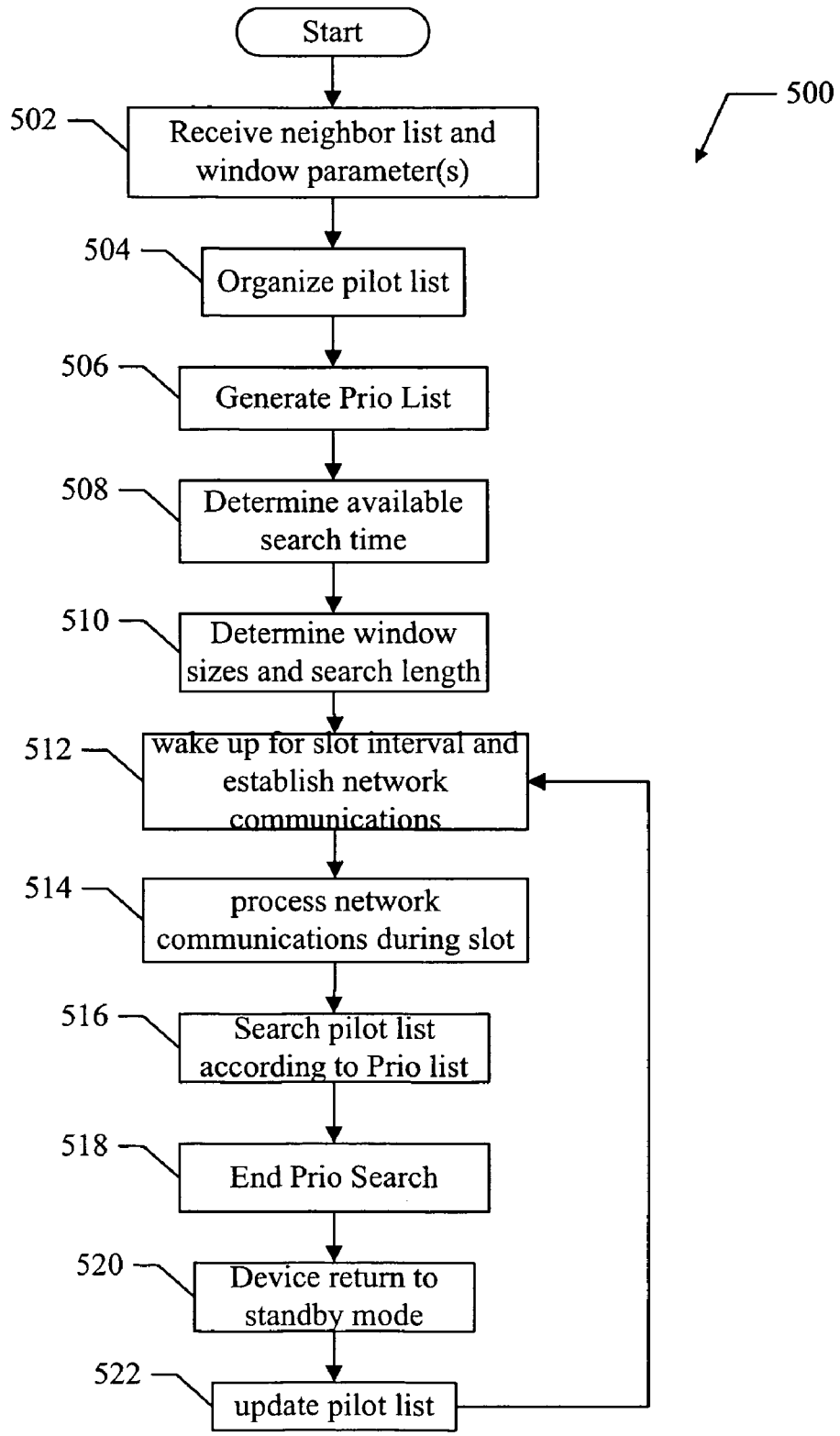
FIG. 5 shows one embodiment of a method for searching a list of pilot signals in a wireless communication network.

FIG. 5 shows one embodiment of a method 500 for searching a list of pilot signals in a wireless communication network. For example, the method is suitable for use by the device 300, and for clarity, the method will be described with reference to the device 300. In one or more embodiments, the functions of the method 500 are performed by the processing logic 302 executing one or more instructions to control one or more other functional elements of the device 300 via the data bus 310.

At block 502, the device receives a neighbor list and window parameters from the network. For example, each base station of the network broadcasts the neighbor list and the window parameters. In one embodiment, the transceiver logic 308 receives the neighbor list 328 and window parameters 330 and stores them in the memory 304.

At block 504, the pilots listed in the neighbor list are organized into a pilot list that comprises an old neighbor list, a strong neighbor list, and a reacquisition list. For example, the pilot prioritization logic 315 organizes the neighbor list 328 into the pilot list 318.

At block 506, a prio list is generated. For example, the prio list 326 comprises a list of pilot signals from the pilot list 318 that are to be searched by the device so that strong pilot signals can be determined. The strong pilot signals determined from the prio list search will be used by the device to maintain communications with the network. In one embodiment, the prio list 326 comprises a selected list of old pilots 320, strong pilots 322, and pilots from the reacquisition list 324. For example, the pilot prioritization logic 315 processes the pilot list 318 to produce the prio list 326.

At block 508, the amount of search time available to search the prio list is determined. For example, if the device is operating in slotted mode, the prio list is searched when the device is active during a slot interval. For example, in one embodiment, if the device is active for the entire slot, and the slot time is approximately eighty milliseconds, then the search time available is approximately eighty milliseconds. If the device is only active for a portion of the slot interval, then the search time available is that portion of the slot interval that the device is active. In one embodiment, the processing logic 302 operates to determine the amount of search time available and inputs this information to the pilot prioritization logic 314 for processing.

In one embodiment, the amount of search time available depends on the operation of the network. For example, if the network operates in a quick paging mode the minimum amount of time the device is active may be very small. For example, if the device need only spend a few milliseconds to determine whether or not it is being paged, then the prio list searching will be set up to occur in just those few milliseconds. Thus, the amount of time available for prio list searching may vary based on the operation of the network, the device, or a combination of both.

At block 510, window sizes are determined for the pilots in the prio list, and the number to pilots in the prio list to be searched is also determined. The window sizes will be used to search the pilots in the prio list. In one embodiment, the window size for each pilot in the prio list is based on window parameters received from the network, for example, the window parameters 330 that are received from the network. In another embodiment, the window parameter for each pilot in the prio list may be set by the pilot prioritization logic 315. For example, the window size for strong pilot signals may be reduced so that more pilot signals in the prio list can be search in a given time interval.

Based on the selected window sizes and the search time determined at block 508, the number of pilots in the prio list that will be searched is determined. For example, if there are twenty milliseconds of available search time, the window sizes will be used to determine how many pilots can be searched. For example, the pilot prioritization logic 315 operates to determine how many pilots can be searched.

At block 512, the device wakes up prior to the designated slot interval to establish network communications. For example, the device uses the pilots in the reacquisition list 324 to establish network communications. In one embodiment, the processing logic 302 determines a wakeup time prior to the start of the slot and accesses the pilots in the reacquisition list 324 and controls the transceiver logic 308 to establish network communications.

At block 514, the device begins processing any network communications that it may receive. For example, the processing logic 302 operates to process any pages or other communications that the device might receive from the network.

At block 516, while the device is in active mode during the slot interval, the prio list is searched. In one embodiment, the pilot prioritization logic 315 operates to control the search logic 312 to search pilots in the prio list based on the window sizes determined at block 510. As each pilot in the prio list is searched, information about that pilot is stored. For example, the signal strength of each pilot searched is stored.

At block 518, the prio search ends. In one embodiment, the number of pilots searched is based on the amount of search time and the window sizes of the pilots. For example, if the device will be active for twenty milliseconds, then the prio search is completed within the twenty milliseconds. In order to accomplish this, the window size and the number of pilots are adjusted to fit within the available twenty milliseconds. Thus, the prio search ends either at or before the end of the active processing by the device. Thus, if the device requires the full slot interval to process network communications, then the prio search may be conducted for the full slot. However, if the device requires less than the full slot, then the prio search is set up to end when the device has completed its processing of the network communications. As a result, the device is able to conserve power by switching to standby mode as quickly as possible. Nonetheless, the pilot searching system is able to effectively search the network environment so that strong pilot signals can be discovered and therefore communications with the network can be maintained without interruptions.

At block 520, the device returns to standby mode. For example, the processing logic 302 operates to place the device in standby mode to conserve power after its slot processing has completed.

At block 522, the pilot list is updated with the results of the prio search. For example, the pilot prioritization logic 315 updates the old list 320, the strong list 322, and the reacq list 324 with information determined during the prio search. As a result, the reacq list 324 is updated with the most recent information, which is then available for use during the next slot cycle. The method then proceeds to block 510, where based on the results of the previous search, window sizes and search length are again determined.

Thus, the method 500 operates to allow a device to efficiently search a list of pilot signals in a wireless communication network. It should be noted that the method 500 illustrates just one embodiment and that changes, additions, or rearrangements of the described functions may be made without deviating from the scope of the described embodiments.

Sleep Holdoff/Early Wakeup

In one embodiment, the system operates to fit the prio search tasks into a limited amount of time with the guarantee of a basic prio search plan (4 neighbors and 1 active). However, in one or more embodiments, it is desirable to sacrifice the device standby time in order to search more pilots in the prio list, for example, 16 neighbors. In one embodiment, a Sleep Holdoff or an Early Wakeup mechanism is added to the system to accomplish this. With Sleep Holdoff, the sleep cycle of the device is delayed by a certain amount of time so that additional prio list searching can occur. With Early Wakeup, before going to sleep, the device calculates an amount of time needed for the prio search given the current prio list, and if necessary, schedules the timeline to wake up earlier than normal before the slot. This allows the device's search logic more time to search pilots in the prio list. By incorporating Sleep Holdoff or Early Wakeup mechanisms, the small prio search time can be minimized in most cases, but if necessary, these mechanism extend the available search time when needed. In one or more embodiments, the Sleep Holdoff and Early Wakeup are implemented by the pilot prioritization logic 314.

Prio Search Timer

In one or more embodiments, a prio search timer is included in the pilot prioritization logic 314. The prio search timer is used when determining how many pilots may be search given relatively short search time. For example, when the device operates in quick paging mode (QPCH) there is limited search time, and so the timer is used to schedule the most efficient use of that search time. However, in other network operating modes there may be more than adequate time to search the prio list.

Assuming that there exists approximately twenty milliseconds to conduct the prio list search, the following describes how prio list searching might be accomplished in one or more embodiments. For a prio list of 40 neighbors all with window sizes of 100 chips, the entire prio list can be searched twice during the twenty milliseconds. If the window size is changed to sixty-four or smaller, the list can be searched three times. However, given these conditions it should be noted that it may not be advantageous to search the prio list as many times as possible because the searching process uses battery power. Furthermore, the extra searching does not provide more accurate estimates of the pilot strengths because it leaves no time diversity between the searches. Therefore, in one embodiment, the system utilizes a prio timer to schedule more effective prio searching. The prio timer utilizes two selectable parameters to schedule prio searches under these conditions. The first parameter is referred to as PRIO_DISTANCE_MS, which is defaulted to a value of ten milliseconds. The second parameter is referred to PRIO_LIST_REPEAT, which is defaulted to a value of one. If PRIO_LIST_REPEAT is greater than one, after the first prio search, the prio timer is set to PRIO_DISTANCE_MS. The next prio search is only scheduled when the prio timer is expired before the sleep command is received. Even if the second prio search is scheduled, it may be aborted if not enough time is available to complete the search before the device enters the sleep mode.

Therefore, in this embodiment, two prio list searches may be performed if a search of the whole prio list takes less than five milliseconds.

Figure 6:
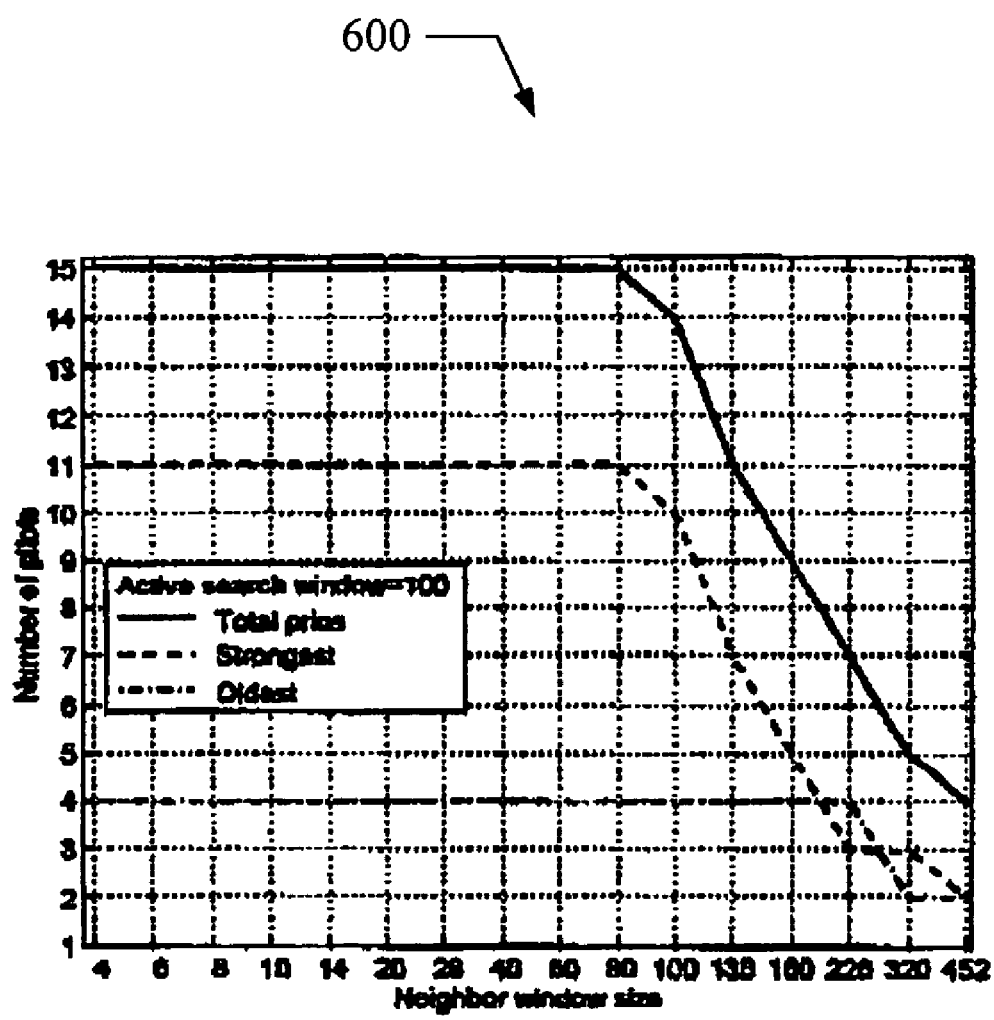
FIG. 6 shows a graph that illustrates the operation of one embodiment of a pilot search system.

FIG. 6 shows a graph 600 that illustrates the operation of one embodiment of a pilot search system. For example, the graph 600 provides window sizes along the horizontal axis and number of pilot that can be searched along the vertical axis. For example, referring to a window size of 100, the graph 600 shows that a total of 14 pilots can be searched that include ten from the strongest list and four from the oldest list.

Accordingly, while one or more embodiments of a pilot search system have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

What is claimed is:

1. A method for searching a list of pilot signals in a communication network, the method comprising:
    defining a prio list that indicates an order in which the list of pilot signals will be searched;
    obtaining a search duration;
    determining an indicator that identifies a portion of the prio list that can be searched within the search duration, wherein some of the portion are searched using an associated over-the-air (OTA) window and some of the portion are searched using an associated reduced time window that is shorter than the associated OTA window and centered around an associated previous strongest signal peak;
    performing a search of the portion of the prio list; and
    updating the list of pilot signals based on the results of the search.

2. The method of claim 1, wherein the step of defining comprises:
    sorting the list of pilot signals into one or more sorted lists based on a signal strength characteristic;
    defining the prio list to include selected pilots from the one or more sorted lists.

3. The method of claim 2, wherein the step of sorting comprises sorting the list of pilot signals into the one or more sorted lists, wherein the one or more sorted lists comprise an old list, a strong list, and a reacquisition list.

4. The method of claim 1, wherein the step of obtaining comprises determining the search duration from a table.

5. The method of claim 1, wherein the step of obtaining comprises determining the search duration from a computation.

6. The method of claim 1, wherein the step of determining comprises: obtaining one or more window size parameters for the list of pilot signals; determining the indicator based on the window size parameters.

7. The method of claim 6, further comprising adjusting the one or more window size parameters so that the indicator indentifies a larger portion of the prio list that can be searched within the search duration.

8. The method of claim 7, wherein the step of adjusting comprises adjusting the one or more window size parameters for one or more strong pilots signals in the list of pilot signals.

9. Apparatus for searching a list of pilot signals in a communication network, the apparatus comprising:
    pilot prioritization logic that operates to define a prio list that indicates an order in which the list of pilot signals will be searched, obtain a search duration; and determine an indicator that identifies a portion of the prio list that can be searched within the search duration, wherein some of the portion are searched using an associated over-the-air (OTA) window and some of the portion are searched using an associated reduced time window that is shorter than the associated OTA window and centered around an associated previous strongest signal peak;
    search logic that operates to perform a search of the portion of the prio list; and
    processing logic that operates to update the list of pilot signals based on the results of the search.

10. The apparatus of claim 9, wherein the pilot prioritizationlogic comprises:
    logic that operates to sort the list of pilot signals into one or more sorted lists based on a signal strength characteristic;
    logic that operates to define the prio list to include selected pilots from the one or more sorted lists.

11. The apparatus of claim 10, wherein the logic that operates to sort comprises logic that operates to sort the list of pilot signals into the one or more sorted lists, wherein the one or more sorted lists comprise an old list, a strong list, and a reacquisition list.

12. The apparatus of claim 9, wherein the pilot prioritization logic comprises logic that operates to determine the search duration from a table.

13. The apparatus of claim 9, wherein the pilot prioritization logic comprises logic that operates to determine the search duration from a computation.

14. The apparatus of claim 9, wherein the pilot prioritizationlogic comprises:
    logic that operates to obtain one or more window size parameters for the list of pilot signals;
    logic that operates to determine the indicator based on the window size parameters.

15. The apparatus of claim 14, wherein the pilot prioritization logic further comprises logic that operates to adjust the one or more window size parameters so that the indicator identifies a larger portion of the prio list that can be searched within the search duration.

16. The apparatus of claim 15, wherein the logic that operates to adjust comprises logic that operates to adjust the one or more window size parameters for one or more strong pilots signals in the list of pilot signals.

17. Apparatus for searching a list of pilot signals in a communication network, the apparatus comprising:
    means for defining a prio list that indicates an order in which the list of pilot signals will be searched;
    means for obtaining a search duration;
    means for determining an indicator that identifies a portion of the prio list that can be searched within the search duration, wherein some of the portion are searched using an associated over-the-air (OTA) window and some of the portion are searched using an associated reduced time window that is shorter than the associated OTA window and centered around an associated previous strongest signal peak;
    means for performing a search of the portion of the prio list; and
    means for updating the list of pilot signals based on the results of the search.

18. The apparatus of claim 17, wherein the means for defining comprises:
    means for sorting the list of pilot signals into one or more sorted lists based on a signal strength characteristic;
    means for defining the prio list to include selected pilots from the one or more sorted lists.

19. The apparatus of claim 18, wherein the means for sorting comprises means for sorting the list of pilot signals into the one or more sorted lists, wherein the one or more sorted lists comprise an old list, a strong list, and a reacquisition list.

20. The apparatus of claim 17, wherein the means for obtaining comprises means for determining the search duration from a table.

21. The apparatus of claim 17, wherein the means for obtaining comprises means for determining the search duration from a computation.

22. The apparatus of claim 17, wherein the means for determining comprises:
   means for obtaining one or more window size parameters for the list of pilot signals;
   means for determining the indicator based on the window size parameters.

23. The apparatus of claim 22, further comprising means for adjusting the one or more window size parameters so that the indicator identifies a larger portion of the prio list that can be searched within the search duration.

24. The apparatus of claim 23, wherein the means for adjusting comprises means for adjusting the one or more window size parameters for one or more strong pilots signals in the list of pilot signals.

25. A computer-readable medium that performs a method for searching a list of pilot signals, said method comprising operations of:
   defining a prio list that indicates an order in which the list of pilot signals will be searched;
   obtaining a search duration;
   determining an indicator that identifies a portion of the prio list that can be searched within the search duration, wherein some of the portion are searched using an associated over-the-air (OTA) window and some of the portion are searched using an associated reduced time window that is shorter than the associated OTA window and centered around an associated previous strongest signal peak;
   performing a search of the portion of the prio list; and
   updating the list of pilot signals based on the results of the search.

26. The computer readable medium of claim 25, wherein the step of defining comprises:
   sorting the list of pilot signals into one or more sorted lists based on a signal strength characteristic;
   defining the prio list to include selected pilots from the one or more sorted lists.

27. The computer readable medium of claim 26, wherein the step of sorting comprises sorting the list of pilot signals into the one or more sorted lists, wherein the one or more sorted lists comprise an old list, a strong list, and a reacquisition list.

28. The computer readable medium of claim 25, wherein the step of obtaining comprises determining the search duration from a table.

29. The computer readable medium of claim 25, wherein the step of obtaining comprises determining the search duration from a computation.

30. The computer readable medium of claim 25, wherein the step of determining comprises:
   obtaining one or more window size parameters for the list of pilot signals;
   determining the indicator based on the window size parameters.

31. The computer readable medium of claim 30, further comprising adjusting the one or more window size parameters so that the indicator identifies a larger portion of the prio list that can be searched within the search duration.

32. The computer readable medium of claim 31, wherein the step of adjusting comprises adjusting the one or more window size parameters for one or more strong pilots signals in the list of pilot signals.

33. A method for searching a list of pilot signals, comprising:
   searching a first set of pilot signals from the list of pilot signals using an over-the-air (OTA) time window associated with each pilot signal when a pre-determined condition exists;
   searching a second set of pilot signals from the list of pilot signals when said predetermined condition does not exist, some of said second set of pilot signals searched using an associated OTA window and some of said second set of pilot signals searched using associated reduced time window that is shorter than the associated OTA window and centered around an associated previous strongest signal peak; and
   re-creating the list of pilot signals in accordance with results obtained from the search.

34. An apparatus for searching a list of pilot signals, comprising:
   a receiver for receiving one or more pilot signals identified in the list of pilot signals;
   an energy estimator for determining an energy associated with each of said one or more pilot signals;
   a memory for storing the list of pilot signals; and
   a processor for searching a first set of pilot signals from the list of pilot signals using an over-the-air (OTA) time window associated with each pilot signal when a predetermined condition exists, for searching a second set of pilot signals from the list of pilot signals when said predetermined condition does not exist, some of said second set of pilot signals searched using an associated OTA window and some of said second set of pilot signals searched using an associated reduced time window that is shorter than the associated OTA window and centered around an associated previous strongest signal peak, for re-creating the list of pilot signals in accordance with results obtained from the search, and for storing the re-created list of pilot signals in the memory.

35. A computer-readable medium that performs a method for searching a list of pilot signals, said method comprising operations of:
   searching a first set of pilot signals from the list of pilot signals using an over-the-air (OTA) time window associated with each pilot signal when a predetermined condition exists;
   searching a second set of pilot signals from the list of pilot signals when said predetermined condition does not exist, some of said second set of pilot signals searched using an associated OTA window and some of said second set of pilot signals searched using an associated reduced time window that is shorter than the associated OTA window and centered around an associated previous strongest signal peak; and
   re-creating the list of pilot signals in accordance with results obtained from the search.

* * * * *